(12) United States Patent
Fan et al.

(10) Patent No.: US 11,663,298 B2
(45) Date of Patent: May 30, 2023

(54) MANAGING ENTERPRISE SOFTWARE LICENSES FOR VIRTUAL NETWORK FUNCTIONS

(71) Applicant: AT&T Intellectual Property I, L.P., Atlanta, GA (US)

(72) Inventors: James Fan, San Ramon, CA (US); Sanjay Agraharam, Marlboro, NJ (US); Steven Polston, Flemington, NJ (US); Michelle Martens, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 498 days.

(21) Appl. No.: 16/710,285

(22) Filed: Dec. 11, 2019

(65) Prior Publication Data
US 2021/0182362 A1 Jun. 17, 2021

(51) Int. Cl.
*G06F 21/10* (2013.01)
*G06F 21/60* (2013.01)
*H04L 9/40* (2022.01)

(52) U.S. Cl.
CPC .......... *G06F 21/105* (2013.01); *G06F 21/602* (2013.01); *H04L 63/0823* (2013.01)

(58) Field of Classification Search
None
See application file for complete search history.

(56) References Cited

U.S. PATENT DOCUMENTS

| 6,374,357 B1 * | 4/2002 | Mohammed | .......... G06F 21/121 |
| | | | 713/176 |
| 10,291,689 B2 * | 5/2019 | Parikh | .................. H04W 88/14 |
| 10,700,946 B2 * | 6/2020 | Kojukhov | .............. H04L 43/55 |

(Continued)

FOREIGN PATENT DOCUMENTS

| WO | WO-2017188682 A1 * | 11/2017 | ........... G06Q 20/145 |
| WO | WO-2018166398 A1 * | 9/2018 | ............. G06F 21/10 |

OTHER PUBLICATIONS

Nogales, et al (Design and Deployment of an Open Management and Orchestration Platform for Multi-Site NFV Experimentation) (Year: 2019).*

(Continued)

*Primary Examiner* — Mamon Obeid
(74) *Attorney, Agent, or Firm* — Hartman & Citrin LLC

(57) ABSTRACT

Concepts and technologies disclosed herein are directed to managing enterprise software licenses for virtual network functions ("VNFs"). According to one aspect disclosed herein, a system can acquire a software license for a software asset to be instantiated and used by a cloud computing environment associated with an enterprise. The system can prepare, with an enterprise anchor point ("EAP") module managed by a vendor of the software asset, a certificate validation process that uses an enterprise security certificate to ensure the software license is valid for an execution instance of the software asset. The system can instantiate the execution instance of the software asset in the cloud computing environment. The system can validate, by the EAP module, the enterprise security certificate to ensure the software asset is instantiated and used in accordance with the software license.

14 Claims, 9 Drawing Sheets

(56) References Cited

U.S. PATENT DOCUMENTS

| | | | | |
|---|---|---|---|---|
| 2002/0012968 A1* | 1/2002 | Carroll | ................ | C07K 14/525 |
| | | | | 435/7.1 |
| 2005/0076218 A1* | 4/2005 | Brown | ............... | G06Q 30/0239 |
| | | | | 705/14.34 |
| 2005/0240671 A1* | 10/2005 | Beyer | ................. | H04L 63/0815 |
| | | | | 709/227 |
| 2006/0089912 A1* | 4/2006 | Spagna | ................. | G06Q 30/00 |
| | | | | 705/51 |
| 2007/0168657 A1* | 7/2007 | Carro | .................... | G06F 21/645 |
| | | | | 713/176 |
| 2008/0114655 A1* | 5/2008 | Skidmore | .......... | G06Q 30/0236 |
| | | | | 705/14.36 |
| 2009/0210703 A1* | 8/2009 | Epstein | ................... | H04L 9/006 |
| | | | | 713/157 |
| 2012/0030224 A1* | 2/2012 | Cohen | .................. | G06F 16/957 |
| | | | | 707/758 |
| 2012/0030556 A1* | 2/2012 | Cohen | ................. | G06F 16/1794 |
| | | | | 715/221 |
| 2013/0163758 A1* | 6/2013 | Swaminathan | ........... | H04L 9/08 |
| | | | | 380/259 |
| 2016/0337329 A1* | 11/2016 | Sood | ........................ | H04L 63/06 |
| 2016/0373419 A1* | 12/2016 | Weigold | ............. | G06Q 20/3829 |
| 2017/0012968 A1* | 1/2017 | Feng | .......................... | G06F 8/63 |
| 2017/0048215 A1* | 2/2017 | Straub | ................. | H04L 63/0823 |
| 2018/0288101 A1* | 10/2018 | Sharma | .................... | H04L 63/12 |
| 2019/0095634 A1* | 3/2019 | Mori | ...................... | H04L 9/0861 |
| 2019/0287146 A1* | 9/2019 | Maitland | ................. | H04L 41/12 |
| 2020/0099591 A1* | 3/2020 | Clarke | .................... | H04L 63/20 |
| 2020/0137160 A1* | 4/2020 | Gopinath | ............. | G06F 9/45558 |
| 2020/0186427 A1* | 6/2020 | Chunduru Venkata | ...................... | |
| | | | | H04L 63/164 |
| 2021/0182362 A1* | 6/2021 | Fan | ...................... | H04L 63/0823 |

OTHER PUBLICATIONS

Security and Security andPrivacy Privacy Privacy Issues in Cloud Computing (Year: 2016).*

* cited by examiner

MANAGING ENTERPRISE SOFTWARE LICENSES FOR VIRTUAL NETWORK FUNCTIONS

BACKGROUND

Software vendors utilize software license plan(s) to sell their software licenses to enterprises and other organizations. In order to carefully manage a number of acquired licenses, enterprises either develop their own custom license management tool software or acquire such a tool to keep track of internal license uses and to provide audit reports to software vendors in accordance with their license agreement(s).

In the past, software was often sold with a license for use with specific hardware. Today, hardware and software components can be virtualized, and individual instances thereof can be instantiated on an as-need basis. For example, service providers such as mobile network operators ("MNOs") and Internet service providers ("ISPs") can utilize network function virtualization ("NFV") technologies to run vendor-supplied virtual network functions ("VNFs") on commodity hardware. This added flexibility introduces new challenges for software vendors to keep track of licenses for their VNF products.

Authentication mechanisms also have been used for hardware devices. Security certificates have been widely used for device authentication. For example, service providers that offer customer premises equipment, such as residential gateways, modems, routers, set-top boxes, and the like, can use embedded security certificates in each device to validate whether the device is allowed to run on the service provider's network.

SUMMARY

Concepts and technologies disclosed herein are directed to managing enterprise software licenses for virtual network functions ("VNFs"). According to one aspect disclosed herein, a system can acquire a software license for a software asset to be instantiated and used by a cloud computing environment associated with an enterprise. The software asset can be any software provided by a vendor. As one non-limiting example disclosed herein, the software asset can be a VNF. The system can prepare, with an enterprise anchor point ("EAP") module managed by a vendor of the software asset, a certificate validation process that uses an enterprise security certificate to ensure the software license is valid for an execution instance of the software asset. The system can instantiate the execution instance of the software asset in the cloud computing environment. The system can validate, by the EAP module, the enterprise security certificate to ensure the software asset is instantiated and used in accordance with the software license.

In some embodiments, the system can acquire the software license for the software asset to be instantiated and used by the cloud computing environment associated with the enterprise at least in part by executing an enterprise entitlement license purchasing and acquisition ("EELPA") module, to negotiate a purchase and acquisition of the software license. In these embodiments, the system can provide, by the EELPA module, license information associated with the software license to an enterprise license tracking ("ELT") module. The system also can provide, by the EELPA module, license metadata associated with the software license to an enterprise service design ("ESD") module. The system can determine, by the ESD module, a service model that uses the software asset in accordance with the software license. The system can provide, by the ESD module, the service model to the ELT module and to an enterprise software instance controller ("ESIC") module.

In some embodiments, the system can receive, by the ESIC module, a software instance instantiation trigger. The system can instantiate the execution instance of the software asset in the cloud computing environment in response to the software instance instantiation trigger. In addition, the system can report, by the ESIC module, tracking and auditing data to an enterprise usage, topology, and inventory ("EUTI") module that, in turn, can provide the feedback to the vendor based upon the tracking and auditing data from all related execution instances of the software asset. The vendor can use the feedback to verify that the software asset is being used in accordance with the software license.

In some embodiments, the certificate validation process can use a supplier license management tracking ("SLMT") module to embed the enterprise security certificate in the software asset and each of its execution instances. The enterprise security certificate can be encrypted based upon any encryption technology (i.e., vendor encryption) specified by the vendor. The EAP module can enable a decryption service for the vendor software. In response to instantiating the execution instance of the software asset in the cloud computing environment, the execution instance can provide the enterprise security certificate to the EAP module. The EAP module can decrypt the vendor encryption of the enterprise security certificate to validate the software license for the execution instance of the software asset.

In some embodiments, the certificate validation process can use the SLMT module to embed a secure uniform resource locator ("URL") and a vendor key in the software asset. The SLMT module can generate the enterprise security certificate and provide the enterprise security certificate to the EAP module. In response to instantiating the execution instance of the software asset in the cloud computing environment, the execution instance can connect to the EAP module, via the secure URL. The EAP module can match the vendor key to the enterprise security certificate. The EAP module can decrypt, via the vendor key, the enterprise security certificate to validate the software license for the execution instance of the software asset.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein provide a comprehensive software license management mechanism to help software vendors and enterprises manage their software licenses. An enterprise anchor point ("EAP") module enables software products to validate that they are operating within an authorized computing environment. Virtual network function ("VNF") suppliers can be assured that their VNF software is running in the computing environment it was intended and has not been pirated. This removes the need for enterprises to implement proprietary vendor servers located within the enterprise's network.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
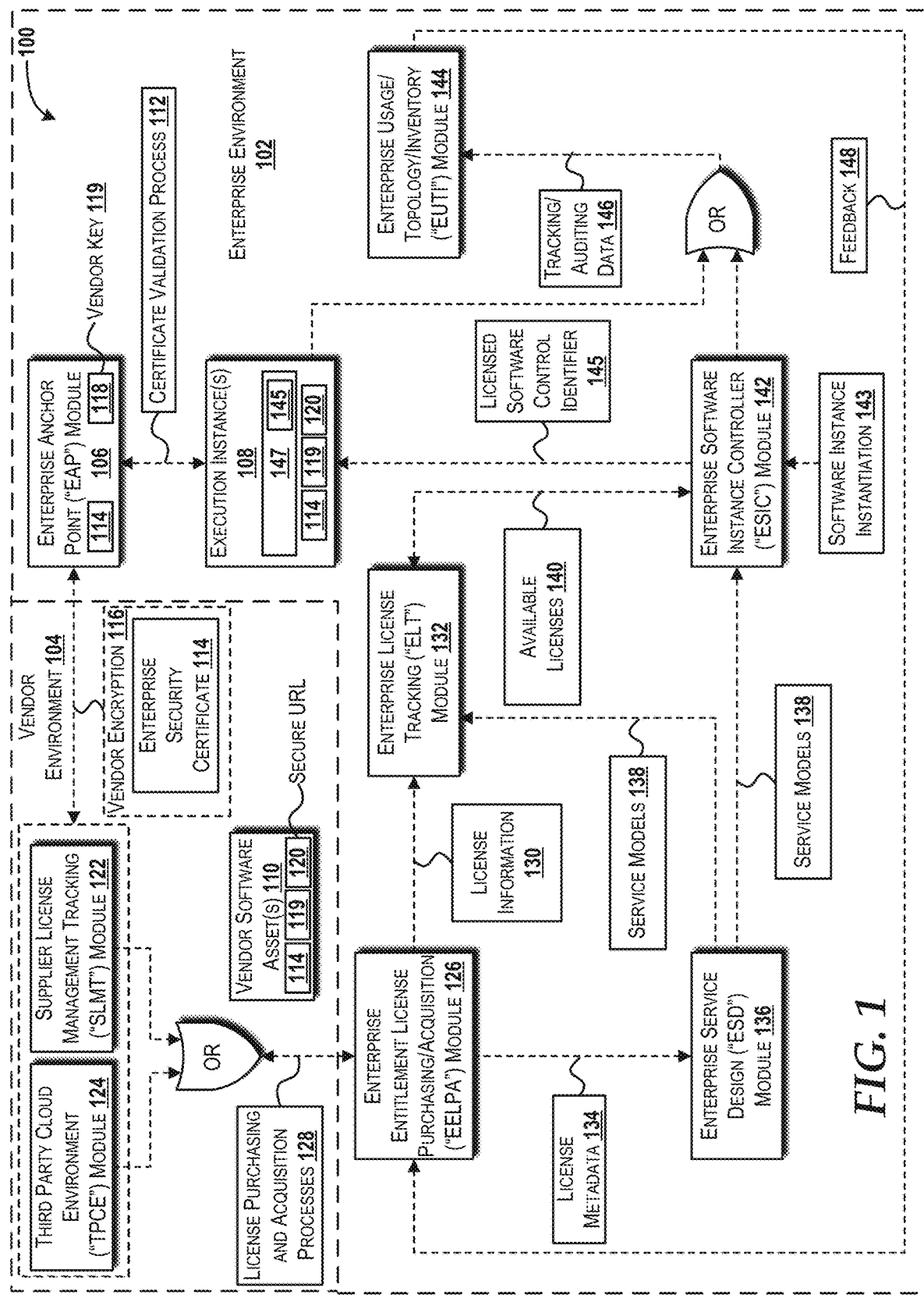
FIG. 1 is a block diagram illustrating aspects of an illustrative operating environment for various concepts and technologies disclosed herein.

Turning now to FIG. 1, an operating environment 100 in which embodiments of the concepts and technologies disclosed herein will be described. The operating environment 100 includes a plurality of distinct modules that are illustrated and described as performing various operations within an enterprise environment 102 and within a vendor environment 104. These modules can be software modules executed, for example, by one or more computing systems, including traditional and/or virtualized computing systems in the enterprise environment 102 or the vendor environment 104. Either or both the enterprise environment 102 and the vendor environment 104 can be implemented, at least in part, as one or more cloud computing environments, although this may not be the case in some implementations.

The modules can be hardware modules or combinations of hardware and software that perform the operations described herein. For ease of explanation, and not limitation, the enterprise environment 102 and the vendor environment 104 will be described as encompassing any and all computing systems capable of executing instructions associated with the various modules to perform operations described herein. As such, the enterprise environment 102 or a portion thereof may be referred to herein as an enterprise system, and the vendor environment 104 or a portion thereof may be referred to herein as a vendor system. These terms are intended to encompass any number of computing systems, traditional or virtualized, that can execute the modules described herein.

The illustrated enterprise environment 102 includes an EAP module 106 and one or more execution instances 108 of one or more vendor software assets 110 offered for licensed use by a vendor. The EAP module 106 can be hosted by the enterprise in the enterprise environment 102, by the vendor in the vendor environment 104, by a third party cloud environment (not shown), or a combination thereof, such as a combination of all three via federation. In some embodiments, the execution instances 108 can be executed among a set of cloud instances that are federated by a cloud provider. The EAP module 106 can be instanced. In some embodiments, each instance of the EAP module 106 is policy-enabled so that its behavior can be tailored to the contractual needs of the vendor and the enterprise.

The vendor software asset 110 can include any software product from which one or more instances (i.e., execution instances 108) can be created. According to one exemplary embodiment disclosed herein, the vendor software asset 110 can include a virtual network function ("VNF") asset provided to an enterprise associated with the enterprise environment 102 by a vendor associated with the vendor environment 104 in accordance with a software licensing agreement (hereinafter "software license"). An enterprise, as used herein, is intended to encompass all types of businesses, including small businesses and large corporations, as well as government organizations, educational entities, and the like. A vendor, as used herein, is intended to encompass all types of software vendors that provide software in accordance with a software license for instantiation in a cloud computing environment, such as in the enterprise environment 102 shown in the illustrated example.

The concepts and technologies disclosed herein find particular application to network functions virtualization ("NFV"). NFV is a new technology initiative that aims to move traditional and evolving mobility networking functions, such as access network elements, core network elements, transport network elements, and others, from purpose-built hardware to commercial-off-the-shelf ("COTS") server-based platforms. This is achieved through virtualization of mobility networking functions to create virtual networking functions ("VNFs") that operate on COTS hardware. An example used herein focuses on the vendor software asset 110 embodied as a VNF asset that can be instantiated on COTS hardware in the enterprise environment 102 or another cloud computing environment selected by the enterprise.

The concepts and technologies disclosed herein are also applicable to software-defined networks ("SDNs"). An SDN provides a software-centric cloud environment for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits over traditional networks. SDN allows for the creation of multiple virtual network control planes on common hardware. SDN helps extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

For some enterprises, such network service providers (e.g., AT&T), orchestration systems like enhanced control, orchestration, management, and policy ("ECOMP") systems have been created to dramatically reduce monotonous tasks and monitoring required by human operators through data-based analytics. Current orchestration systems often incite frustration among operators due to over-complicated network status readouts, non-specific network manipulations automatically performed by the orchestration system, and the inability to quickly "revert" changes caused by such manipulations. AT&T's ECOMP system has been combined with the Open Orchestrator Project ("OPEN-O") to create the Open Network Automation Platform ("ONAP") project supported by the Linux Foundation. ONAP is an open source software platform that delivers capabilities for the design, creation, orchestration, monitoring, and life cycle management of SDNs and the VNFs operating therein, as well as higher-level services that utilize the functionality of SDN/VNF. ONAP provides automatic, policy-driven interaction of these functions and services in a dynamic, real-time cloud environment. ONAP also provides graphical design tools for function/service creation. Those skilled in the art will appreciate the applicability of the concepts and technologies disclosed herein for implementation with systems such as ECOMP systems and platforms such as ONAP.

The EAP module 106 provides a comprehensive software license management mechanism to help vendors and enterprises manage software licenses for the vendor software assets 110. The EAP module 106 provides anti-piracy protections for vendors and enables software products to validate that they are operating within an authorized computing environment, such as the enterprise environment 102. In addition, the EAP module 106 removes the need for an enterprise to host a vendor's proprietary server in their network.

The EAP module 106 can utilize an SSL handshake (or other security technology) with the execution instance(s) 108 to exchange security certificate information for validation purposes. When an execution instance 108 is instantiated in the enterprise environment 102, the EAP module 106 can mediate a certificate validation process 112 between that execution instance 108 and the vendor who supplied the vendor software asset 110 upon which the execution instance 108 is based.

The certificate validation process 112 can be implemented in numerous ways. Two example certificate validation processes 112 will now be described. The certificate validation process 112 can be implemented with the EAP module hosted/managed by the enterprise or by the vendor. These example processes are exemplary, and should not be construed as being limiting in any way.

According to a first example of the certificate validation process 112, the vendor can embed an enterprise security certificate 114 in each of the vendor software assets 110. Prior to the certificate validation process 112, a contract can be executed between the vendor and the enterprise with regard to one or more software licenses for the instantiation and the use of one or more execution instances 108 based upon one or more of the vendor software assets 110. It is contemplated that each of the software assets may use the same enterprise security certificate 114 or a different enterprise security certificate 114. It is further contemplated that bundles of two or more of the vendor software assets 110 may utilize the same enterprise security certificate 114. The vendor can encrypt the enterprise security certificate 114 using any vendor encryption 116 (e.g., secure socket layer ("SSL"). The vendor can then enable a decryption service 118 in the EAP module 106. The decryption service 118 can utilize a vendor key 119 provided by the vendor to decrypt the enterprise security certificate 114 received from the execution instance 108. When the vendor software asset 110 is instantiated as the execution instance 108 in the enterprise environment 102 (or in another cloud computing environment selected by the enterprise), the execution instance 108 sends the enterprise security certificate 114 to the EAP module 106. The EAP module 106 decrypts the enterprise security certificate 114 using the vendor key 119 and reports back to the execution instance 108 if the enterprise has a valid software license. If so, the execution instance 108 can proceed to operate as intended.

According to a second example, the certificate validation process 112 can be based upon the enterprise security certificate 114 residing on the EAP module 106. Prior to the certificate validation process 112, a contract can be executed between the vendor and the enterprise with regard to one or more software licenses for the instantiation and the use of one or more execution instances 108 based upon one or more of the vendor software assets 110. The vendor can embed the vendor key 119 and a secure URL 120 in each of the software assets 110. The vendor can provide the enterprise security certificate(s) 114 for each of the vendor software assets 110 to the EAP module 106. When the vendor software asset 110 is instantiated as one or more execution instances 108 in the enterprise environment 102, each execution instance 108 can use the embedded secure URL 120 to connect to the EAP module 106. The EAP module 106 can use the vendor key 119 provided by the execution instance 108 to match to the correct enterprise security certificate 114. The EAP module 106 decrypts the enterprise security certificate 114 using the vendor key 119 and reports back to the execution instance 108 if the enterprise has a valid software license. If so, the execution instance 108 can proceed to operate as intended.

The illustrated vendor environment 104 includes a supplier license management tracking module ("SLMT") module 122 and a third party cloud environment ("TPCE") module 124 that are in communication with the EAP module 106. Although the EAP module 106 is shown as operating in the enterprise environment 102, the EAP module 106 can be managed by the vendor via the SLMT module 122 and the TPCE module 124.

The TPCE module 124 provides a third party cloud implementation in which a vendor or an enterprise can choose to have a third party cloud (not shown) to host the SLMT module 122 and/or the EAP module 106. The SLMT module 122 can be built, managed, and hosted by each software vendor in their respective vendor environment 104. The SLMT module 122 can provide an interface between the vendor environment 104 and the EAP module 106 operating in the enterprise environment 102 (or elsewhere as the case may be). The SLMT module 122 can use this interface to provide the enterprise security certificates 114 to the EAP module 106 and to make changes, if necessary, to one or more of the enterprise security certificates 114 already residing on the EAP module 106. The SLMT module 122 also provides an interface to an enterprise entitlement license purchasing/acquisition ("EELPA") module 126, which handles license purchasing and acquisition processes 128 between the vendor and the enterprise. The EELPA module 126 will be described in further detail below.

The EELPA module 126 enables the enterprise to purchase or acquire software licenses from the vendor under negotiated contract(s). The EELPA module 126 has three interfaces in the illustrated example: an interface to the SLMT module 122 for license purchasing and acquisition; another interface to provide license information 130 to an enterprise license tracking ("ELT") module 132; and a third interface to provide license metadata 134 to an enterprise service design ("ESD") module 136 to build licensed software products into one or more service models 138 (e.g., that utilize the VNFs that can now be instantiated under the negotiated contract).

The ELT module 132 receives the license information 130 from the EELPA module 126. The ELT module 132 also receives the service models 138 from the ESD module 136. The ELT module 132 can combine the license information 130 and the service models 138 (shown as available licenses 140) to an enterprise software instance controller ("ESIC") module 142. The ESIC module 142 can use the available licenses 140 to support decisions regarding software instance instantiation 143.

The ESD module 136 allows service designers to design the service models 138. The ESD module 136 can provide the service models 138 to the ELT module 132 and the ESIC module 142. The ESD module 136, in some embodiments, is or includes a service design and creation ("SDC") ONAP subsystem that provides an online catalog of virtual parts for service designers to create new reusable building blocks and combine those blocks in different ways to build the service models 138.

The ESD module 136 can support a collaborative and iterative approach for the service designers to design recipes, templates, policies, models, analytics, algorithms, VNFs, and/or at least a portion thereof for implementation in the enterprise environment 102, resources of the enterprise environment 102, and/or one or more network configurations for one or more networks with which the enterprise environment 102 is in communication.

As used herein, a "recipe" includes a structured set of data that expresses relationships of entities, processes, rules/policies, and/or other relationships used to define configurable management behavior. As used herein, a "template" includes a portal form to capture required parameters, additional parameters, composition graph/type/process, capability and management APIs, capability policies, and other configurable data parameters disclosed herein. As used herein, a "policy" can include a modifiable rule, assertions, and/or conditions under which to enable real-time decision making on corrective actions and configuration changes to the VNFs. By way of example, policies can be implemented via policy engines such as Drools or XACML. As used herein, a "model" includes data attributes of objects, the relationships amongst the objects, and the associated management methodologies (e.g., processes, analytics, and policies). As used herein, an "algorithm" includes step-by-step operations to perform calculations, data processing, and automated reasoning. As used herein, "analytics" can be implemented via an analytics engine/application that analyzes the collected data (including analysis of data collected over time) and detects policy violations by discovering temporal, spatial, or geographical patterns in the data.

The ESIC module 142 acts as a software instance instantiation controller in the enterprise. The ESIC module 142 detects/receives instantiation triggers. The ESIC module 142 consults with the ELT module 132 to verify licenses/entitlements. If a license/entitlement is available, the ESIC module 142 can instantiate the execution instance 108 based on the service models 138 (or recipes, etc.) provided by the ESD module 136. The ESIC module 142 also reports instantiation of the execution instances 108 to an enterprise usage topology/inventory ("EUTI") module 144. The ESIC module 142 also generates a licensed software control identifier 145 that is used as an invariant control number for tracking software processes and activities (e.g., logs and events) associated with the managed execution of the vendor software asset 110 as the execution instance(s) 108. In some implementations, the execution instance 108 may have one or more virtual instances of itself that run in parallel over time. Each of the instances may have a unique subordinate instance identifier ("execution instance identifier 147") that carries the licensed software control identifier 145 of the vendor software asset 110 upon which it is created. In addition, each of the execution instances 108 can be associated with a potentially unique set of allotted resources, and can add the licensed software control identifier 145 and any associated execution instance metadata to the activities (logs, events) to provide the provenance required to ensure an auditable control system. The SLMT module 122 generates and maintains an inventory of each licensed software control identifier 145 that is invariant across all execution instances 108, each using a copy of the enterprise security certificate 114. The ESIC module 142 can generate and maintain an inventory of each execution instance identifier 147 and its associated licensed software control identifier 145 used when each execution instance 108 generates and stamps its associated metadata as part of a full set of metadata generated over time for the vendor software asset 110. The EUTI module 144 can query the SLMT module 122 using a specific licensed software control identifier 145 to obtain the set of associated execution instance identifiers 147 used to extract all relevant metadata for auditing and reporting. This enables a general capability across any license type (e.g., term-based, activity-based, and the like).

The EUTI module 144 receives updates about new instance topology, usage, and other tracking/auditing data (all generally shown as tracking/auditing data 146) from the ESIC module 142 and/or the execution instances 108. The licensed software control identifier 145 is used by the EUTI module 144 to extract all relevant metadata from the execution environment(s) in which the execution instance(s) 108 spend their lifespan. The EUTI module 144 provides feedback 148 to the EELPA module 126. The feedback 148 can be shared with the vendor, such as to verify whether the enterprise's use of the vendor software asset(s) 110 is in accordance with any contract(s).

Figure 2:
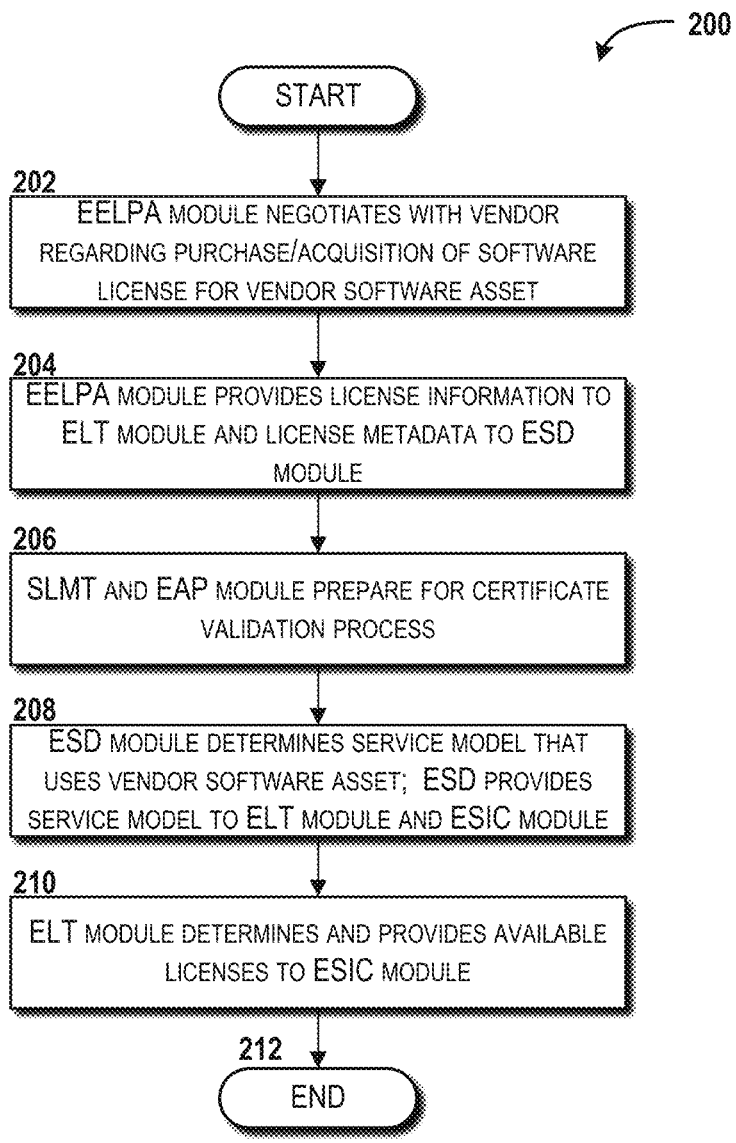
FIG. 2 is a flow diagram illustrating aspects of a method for managing enterprise software licenses for virtual network functions ("VNFs") before instantiation, according to an illustrative embodiment of the concepts and technologies disclosed herein.

Turning now to FIG. 2, a flow diagram illustrating aspects of a method 200 for managing enterprise software licenses for one or more vendor software assets 110 before instantiation as one or more execution instances 108 (e.g., VNFs) will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. Moreover, the method 200 will be described in context of one vendor offering one vendor software asset 110 to one enterprise under one software license to instantiate one execution instance 108 of the vendor software asset 110. Those skilled in the art will appreciate the applicability of the method 200 to any number of vendors, vendor software assets 110, enterprises, software licenses, and execution instances 108, including in sequential and parallel processes.

The method 200 begins and proceeds to operation 202. At operation 202, the EELPA module 126 negotiates with the vendor regarding the purchase/acquisition of a software license for the vendor software asset 110. The details of the purchase/acquisition are particular to each negotiation, and therefore it is impossible to provide an exhaustive list of potential negotiations and the resultant contract terms. The EELPA module 126 can negotiate with the vendor automatically, wherein such automation is driven, at least in part, by artificial intelligence technologies. Alternatively, or additionally, the EELPA module 126 can provide an interface for a representative of the enterprise to negotiate with a representative of the vendor.

From operation 202, the method 200 proceeds to operation 204. At operation 204, the EELPA module 126 provides the information 130 associated with the negotiated license to the ELT module 132 for tracking purposes. The EELPA module 126 also provides the license metadata 134 to the ESD module 136 for service design purposes.

From operation 204, the method 200 proceeds to operation 206. At operation 206, the SLMT module 122 and the EAP module 106 prepare for the certificate validation process 112. In some embodiments, the SLMT module 122 can generate the enterprise security certificate 114, encrypt the enterprise security certificate 114 using the vendor encryption 116, and can send the enterprise security certificate 114 to the EAP module 106 for later use. Meanwhile, the vendor software asset 110 can be embedded with the vendor key 119 to be used by the execution instance 108 instantiated from the vendor software asset 110 to decrypt the vendor encryption 116 to validate the software license for the vendor software asset 110. In some other embodiments, the SLMT module 122 can generate the enterprise security certificate 114, encrypt the enterprise security certificate using the vendor encryption 116, and can embed/build-in the enterprise security certificate 114 into the vendor software asset 110 such that when the vendor software asset 110 is instantiated as the execution instance 108, the execution instance 108 can provide the enterprise security certificate 114 to the EAP module 106 for decryption. These embodiments are merely illustrative of the certificate validation process 112, and therefore should not be construed as being limiting in any way.

From operation 206, the method 200 proceeds to operation 208. At operation 208, the ESD module 136 determines a service model that uses the vendor software asset 110. The ESD module 136 then provides the service model 138 to the ELT module 132 and the ESIC module 142.

From operation 208, the method 200 proceeds to operation 210. At operation 210, the ELT module 132 determines the available licenses 140 based upon the license information 130 and the service models 138. The ELT module 132 then provides the available licenses 140 to the ESIC module 142. The ELT module 132 may provide the available licenses 140 to the ESIC module 142 as needed, such as in response to a request made by the ESIC module 142 as part of the software instance instantiation 143 process.

From operation 210, the method 200 proceeds to operation 212. The method 200 can end at operation 212.

Figure 3:
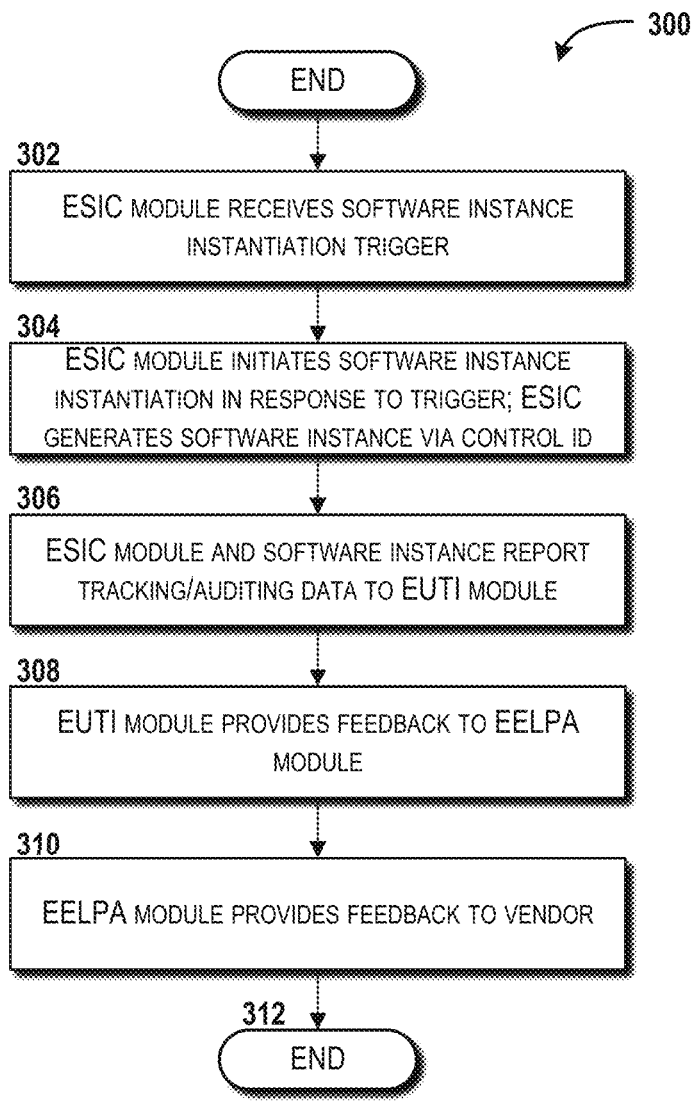
FIG. 3 is a flow diagram illustrating aspects of a method for managing enterprise software licenses for VNFs during and after instantiation, according to an illustrative embodiment of the concepts and technologies disclosed herein.

Turning now to FIG. 3, a flow diagram illustrating aspects of a method 300 for managing enterprise software licenses for one or more vendor software assets 110 during and post instantiation as one or more execution instances 108 (e.g., VNFs) will be described will be described, according to an illustrative embodiment of the concepts and technologies disclosed herein. The method 300 will be described with reference to FIG. 3 and further reference to FIG. 1. Moreover, the method 300 will be described in context of one vendor offering one vendor software asset 110 to one enterprise under one software license to instantiate one execution instance 108 of the vendor software asset 110. Those skilled in the art will appreciate the applicability of the method 300 to any number of vendors, vendor software assets 110, enterprises, software licenses, and execution instances 108, including in sequential and parallel processes.

The method 300 begins and proceeds to operation 302. At operation 302, the ESIC module 142 receives a software instance instantiation trigger and verifies with the ELT module 132 that the available licenses 140 includes a license for the execution instance 108 requested in the software instance instantiation trigger. The software instance instantiation trigger can be anything that causes or requests the execution instance 108 to be instantiated.

From operation 302, the method 300 proceeds to operation 304. At operation 304, the ESIC module 142 initiates the software instance instantiation 143 in response to the trigger. In addition, at operation 304, the ESIC module 142 also generates the licensed software control identifier 145 that is used as an invariant control number for tracking the software processes and activities (e.g., logs and events) associated with the managed execution of the vendor software asset 110 as the execution instance(s) 108. The enterprise environment 102 (or other computing environment as the case may be) can then instantiate the execution instance 108.

From operation 304, the method 300 proceeds to operation 306. At operation 306, the ESIC module 142 and the execution instance 108 can report the tracking/auditing data 146 to the EUTI module 144 using the licensed software control identifier 145 to identify the tracking/auditing data 146 as being associated with the execution instance 108. The EUTI module 144, at operation 308, can provide the feedback 148 to the EELPA module 126. The feedback 148 can be shared with the vendor, such as to verify whether the enterprise's use of the vendor software asset(s) 110 is in accordance with any contract(s). From operation 308, the method 300 proceeds to operation 310. At operation 310, the EELPA module 126 provides the feedback 148 to the vendor. In this manner, the feedback 148 can be shared with the vendor, such as to verify whether the enterprise's use of the vendor software asset 110 to instantiate the execution instance 108 is in accordance with any contract(s) negotiated (e.g., as part of operation 202 in FIG. 2).

From operation 310, the method 300 proceeds to operation 312. At operation 312, the method 300 can end.

Figure 4:
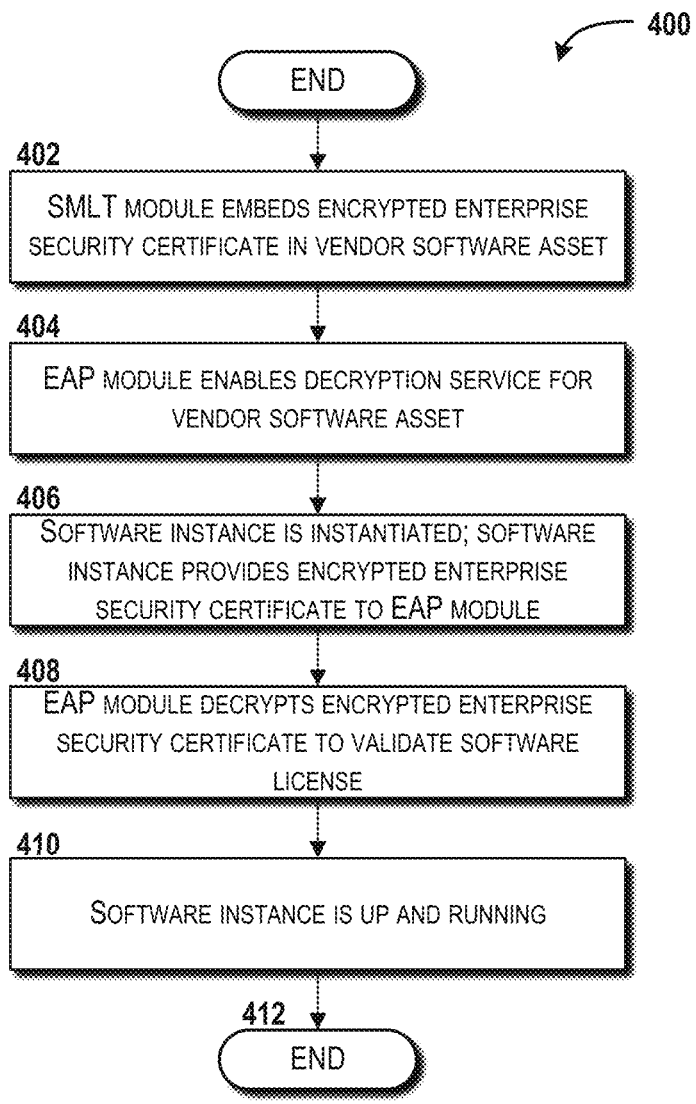
FIG. 4 is a flow diagram illustrating aspects of a method for validating an enterprise software license, according to an illustrative embodiment of the concepts and technologies disclosed herein.

Turning now to FIG. 4, a flow diagram illustrating aspects of a method 400 for validating an enterprise software license will be described, according to an illustrative embodiment of the concepts and technologies disclosed herein. The method 400 is used an illustrative example of the certificate validation process 112 introduced above with respect to FIG. 1. The certificate validation process 112 can be implemented in numerous ways. The method 400 illustrates one non-limiting example of a way in which the certificate validation process 112 can be used for embedding the enterprise security certificate 114 in the vendor software asset 110.

The method 400 begins and proceeds to operation 402. At operation 402, the SLMT module 122 embeds the enterprise security certificate 114 that has been encrypted via the vendor encryption 116 (referred to as "encrypted enterprise security certificate 114" for the remainder of the description of the method 400) in the vendor software asset 110. From operation 402, the method 400 proceeds to operation 404. At operation 404, the EAP module 106 enables the decryption service 118 for the vendor software asset 110. For example, the SLMT module 12 can request the decryption service 118 and provide the vendor key 119 necessary for the EAP module 106 to decrypt the encrypted enterprise security certificate 114.

From operation 404, the method 400 proceeds to operation 406. At operation 406, the execution instance 108 of the vendor software asset 110 is instantiated. Also at operation 406, the execution instance 108 provides the encrypted enterprise security certificate 114 to the EAP module 106.

From operation 406, the method 400 proceeds to operation 408. At operation 408, the EAP module 106 decrypts the encrypted enterprise security certificate 114 to validate the software license.

From operation 408, the method 400 proceeds to operation 410. At operation 410, the execution instance 108 is up and running in accordance with the software license. From operation 410, the method 400 proceeds to operation 412. At operation 412, the method 400 can end.

Figure 5:
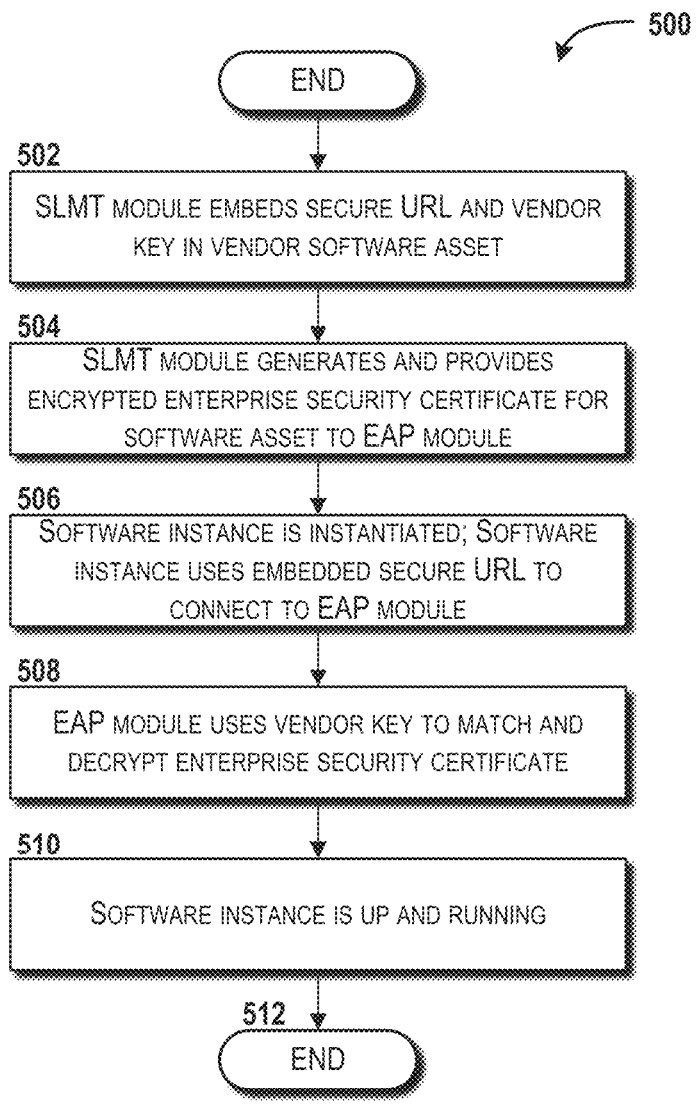
FIG. 5 is a flow diagram illustrating aspects of another method for validating an enterprise software license, according to an illustrative embodiment of the concepts and technologies disclosed herein.

Turning now to FIG. 5, a flow diagram illustrating aspects of another method 500 for validating an enterprise software license will be described, according to an illustrative embodiment of the concepts and technologies disclosed herein. The method 500 is used an illustrative example of the certificate validation process 112 introduced above with respects to FIG. 1. The certificate validation process 112 can be implemented in numerous ways. The method 500 illustrates one non-limiting example of a way in which the certificate validation process 112 can be used with the enterprise security certificate 114 residing on the EAP module 106.

The method 500 begins and proceeds to operation 502. At operation 502, the SLMT module 122 embeds the secure URL 120 and vendor key 119 in the vendor software asset 110. From operation 502, the method 500 proceeds to operation 504. At operation 504, the SLMT module 122 generates and provides the enterprise security certificate 114 that has been encrypted via the vendor encryption 116 (referred to as "encrypted enterprise security certificate 114" for the remainder of the description of the method 500) for the vendor software asset 110 to the EAP module 106.

From operation 504, the method 500 proceeds to operation 506. At operation 506, the execution instance 108 is instantiated. The execution instance 108 can use the embedded secure URL 120 to connect to the EAP module 106. From operation 506, the method 500 proceeds to operation 508. At operation 508, the EAP module 106 uses the vendor key 119 to match and decrypt the encrypted enterprise security certificate 114 for the vendor software asset 110 instantiated in the execution instance 108.

From operation 508, the method 500 proceeds to operation 510. At operation 510, the execution instance 108 is up and running in accordance with the software license. From operation 510, the method 500 proceeds to operation 512. At operation 512, the method 500 can end.

Figure 6:
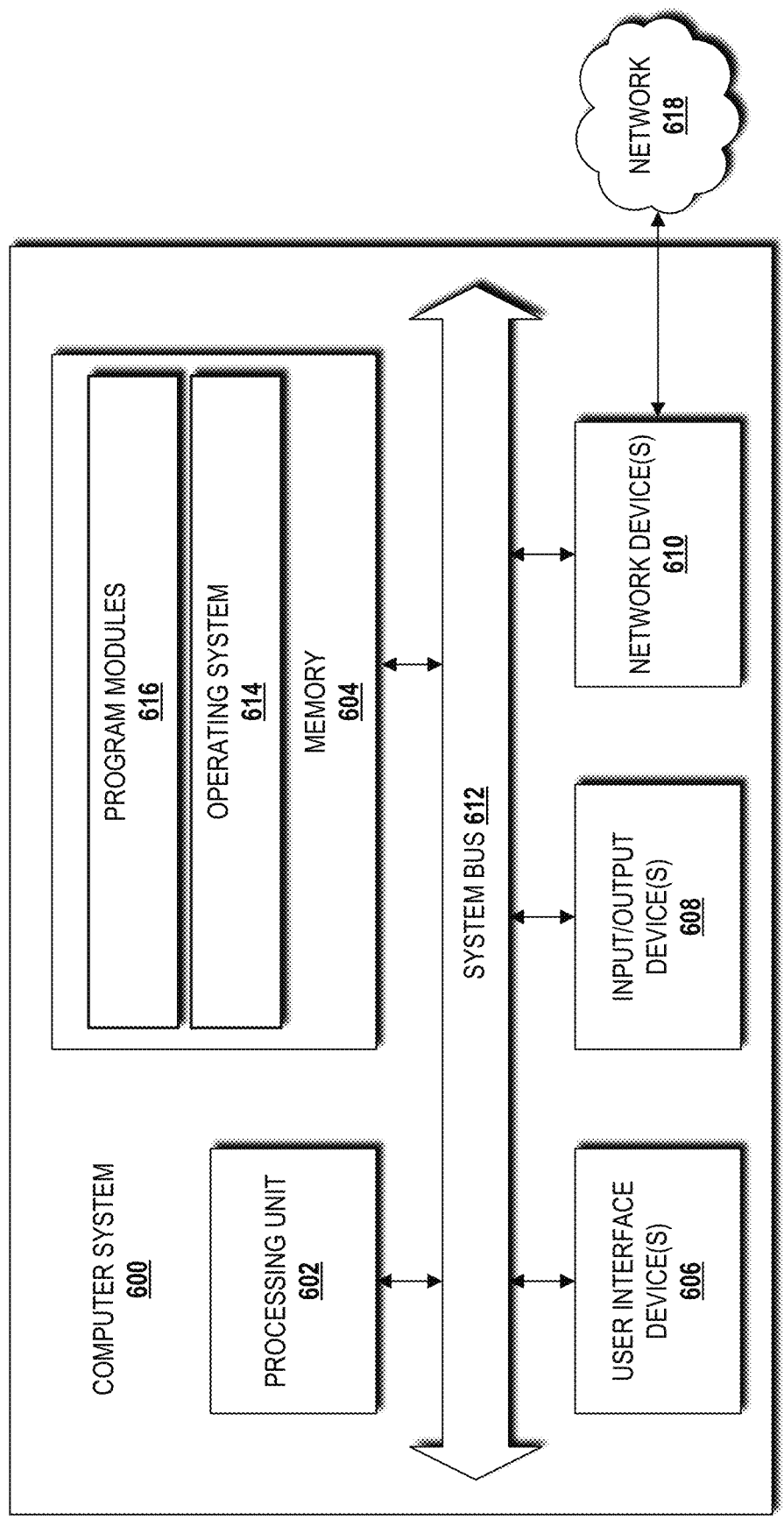
FIG. 6 is a block diagram illustrating an example computer system, according to some illustrative embodiments.

Turning now to FIG. 6, a block diagram illustrating a computer system 600 configured to provide the functionality described herein in accordance with various embodiments of the concepts and technologies disclosed herein will be described. The enterprise environment 102 (embodied as an enterprise system) and/or the vendor environment 104 (embodied as a vendor system), one or more components thereof (e.g., the distinct modules illustrated and described above with reference to FIG. 1), and/or other systems disclosed herein can be configured like and/or can have an architecture similar or identical to the computer system 600 described herein with respect to FIG. 6. It should be understood, however, that any of these systems, devices, or elements may or may not include the functionality described herein with reference to FIG. 6.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer system 600.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like. The program modules 616 can include various software and/or program modules described herein, such as the EAP module 106, the SLMT module 122, the TPCE module 124, the EELPA module 126, the ELT module 132, the ESD module 136, the ESIC module 142, the EUTI module 144, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium," "computer-readable storage medium," and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer to output data.

The network devices 610 enable the computer system 600 to communicate with one or more networks 618, such as one or more networks implemented as part of the enterprise environment 102, the vendor environment 104, and/or other networks not specifically disclosed herein. Examples of the network devices 610 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such as a WiMAX network, or a cellular network. Alternatively, the network(s) may be a wired network such as, but not limited to, a WAN such as the Internet, a LAN, a wired PAN, or a wired MAN.

Figure 7:
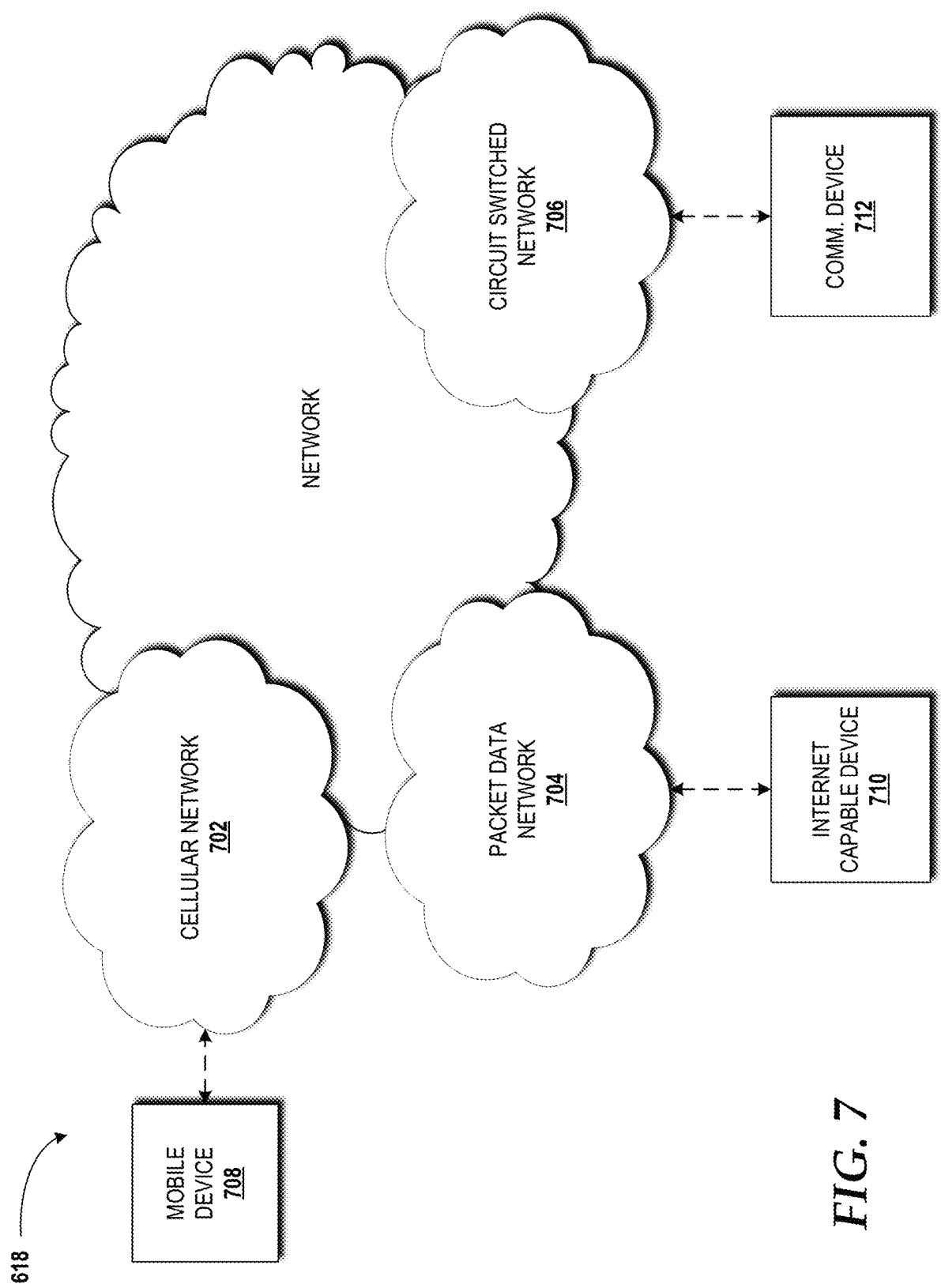
FIG. 7 schematically illustrates a network, according to an illustrative embodiment.

Turning now to FIG. 7, additional details of an embodiment of the network 618 will be described, according to an illustrative embodiment. In the illustrated embodiment, the network 618 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured to utilize any using any wireless communications technology or combination of wireless communications technologies, some examples of which include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE")

802.XX technologies, and the like. The mobile communications device 708 can communicate with the cellular network 702 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the mobile communications device 708 and the cellular network 702 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the cellular network 702 may additionally include backbone infrastructure that operates on wired communications technologies, including, but not limited to, optical fiber, coaxial cable, twisted pair cable, and the like to transfer data between various systems operating on or in communication with the cellular network 702.

The packet data network 704 can include various devices, servers, computers, databases, and other devices in communication with one another. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet.

The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable systems/devices 710, a personal computer ("PC"), a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. It should be appreciated that substantially all of the functionality described with reference to the network 618 can be performed by the cellular network 702, the packet data network 704, and/or the circuit switched network 706, alone or in combination with additional and/or alternative networks, network elements, and the like.

Figure 8:
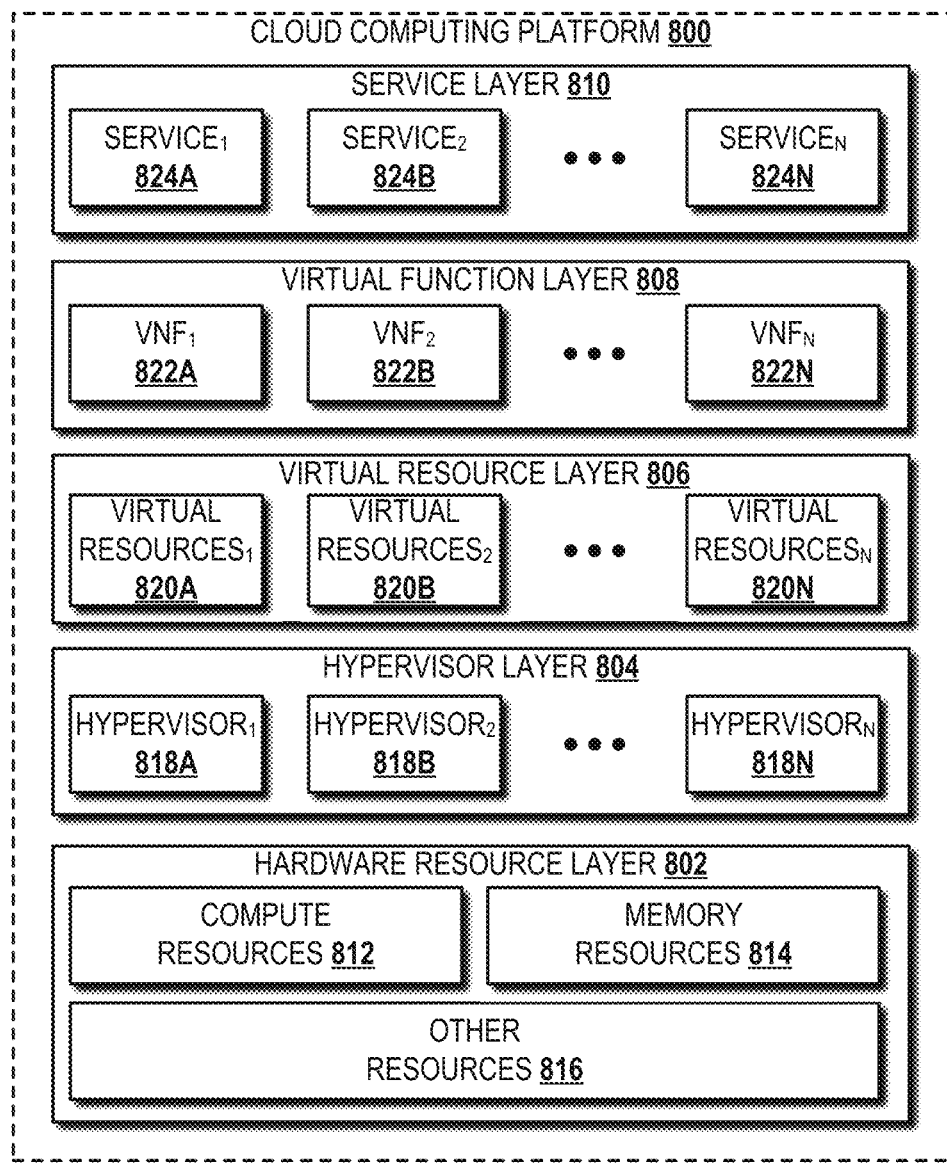
FIG. 8 is a block diagram illustrating a cloud computing environment capable of implementing aspects of the concepts and technologies disclosed herein.

Turning now to FIG. 8, an illustrative cloud computing platform 800 capable of implementing aspects of the enterprise environment 102, the vendor environment 104, and/or other cloud computing environments (e.g., third party clouds) will be described, according to an illustrative embodiment. The cloud computing platform 800 includes a hardware resource layer 802, a hypervisor layer 804, a virtual resource layer 806, a virtual function layer 808, and a service layer 810. While no connections are shown between the layers illustrated in FIG. 8, it should be understood that some, none, or all of the components illustrated in FIG. 8 can be configured to interact with one other to carry out various functions described herein. In some embodiments, the components are arranged so as to communicate via one or more networks. Thus, it should be understood that FIG. 8 and the remaining description are intended to provide a general understanding of a suitable environment in which various aspects of the embodiments described herein can be implemented and should not be construed as being limiting in any way.

The hardware resource layer 802 provides hardware resources. In the illustrated embodiment, the hardware resource layer 802 includes one or more compute resources 812, one or more memory resources 814, and one or more other resources 816. The compute resource(s) 812 can include one or more hardware components that perform computations to process data and/or to execute computer-executable instructions of one or more application programs, one or more operating systems, and/or other software. In particular, the compute resources 812 can include one or more central processing units ("CPUs") configured with one or more processing cores. The compute resources 812 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 812 can include one or more discrete GPUs. In some other embodiments, the compute resources 812 can include CPU and GPU components that are configured in accordance with a co-processing CPU/GPU computing model, wherein the sequential part of an application executes on the CPU and the computationally-intensive part is accelerated by the GPU processing capabilities. The compute resources 812 can include one or more system-on-chip ("SoC") components along with one or more other components, including, for example, one or more of the memory resources 814, and/or one or more of the other resources 816. In some embodiments, the compute resources 812 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 812 can be or can include one or more hardware components architected in accordance with an ARM architecture, available for license from ARM HOLDINGS of Cambridge, United Kingdom. Alternatively, the compute resources 812 can be or can include one or more hardware components architected in accordance with an x86 architecture, such an architecture available from INTEL CORPORATION of Mountain View, Calif., and others. Those skilled in the art will appreciate the implementation of the compute resources 812 can utilize various computation architectures, and as such, the compute resources 812 should not be construed as being limited to any particular computation architecture or combination of computation architectures, including those explicitly disclosed herein.

The memory resource(s) 814 can include one or more hardware components that perform storage/memory operations, including temporary or permanent storage operations. In some embodiments, the memory resource(s) 814 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 812.

The other resource(s) 816 can include any other hardware resources that can be utilized by the compute resources(s) 812 and/or the memory resource(s) 814 to perform operations described herein. The other resource(s) 816 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more hypervisors 818A-818N (also known as "virtual machine monitors") operating within the hypervisor layer 804 to create virtual resources that reside in the virtual resource layer 806. The hypervisors 818A-818N can be or can include software, firmware, and/or hardware that alone or in combination with other software, firmware, and/or hardware, creates and manages virtual resources 820A-820N operating within the virtual resource layer 806.

The virtual resources 820A-820N operating within the virtual resource layer 806 can include abstractions of at least a portion of the compute resources 812, the memory resources 814, and/or the other resources 816, or any combination thereof. In some embodiments, the abstractions can include one or more VMs, virtual volumes, virtual networks, and/or other virtualized resources upon which one or more VNFs 822A-822N (e.g. one or more of the execution instances 108) can be executed. The VNFs 822A-822N in the virtual function layer 808 are constructed out of the virtual resources 820A-820N in the virtual resource layer 806. In the illustrated example, the VNFs 822A-822N can provide, at least in part, one or more services 824A-824N in the service layer 810. The services 824A-824N can be modeled, for example, based upon the service models 138 created by the ESD module 136.

Figure 9:
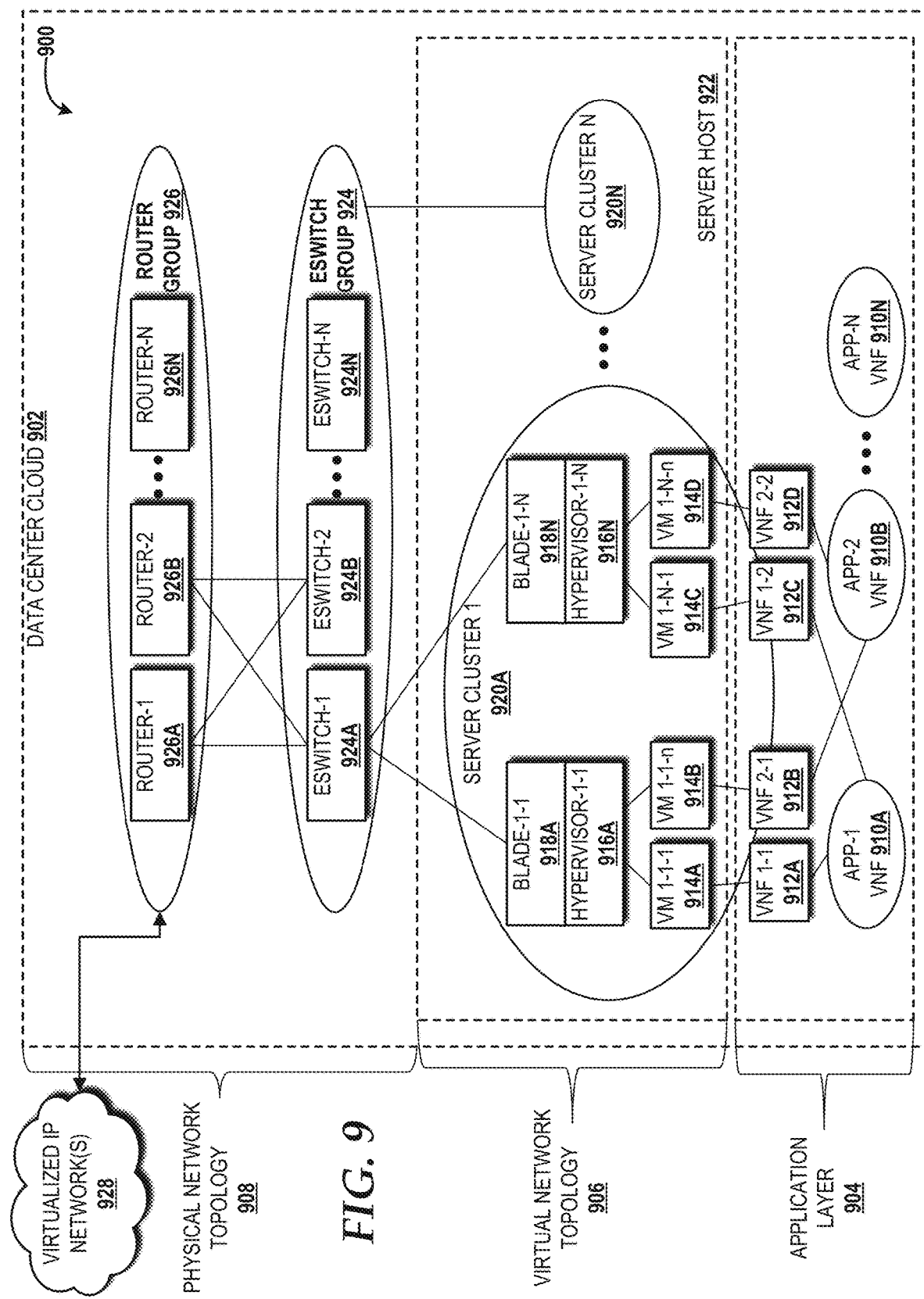
FIG. 9 is a diagram illustrating a network topology for a data center cloud, according to an illustrative embodiment.

Turning now to FIG. 9, a network topology 900 for a data center cloud 902 will be described, according to an illustrative embodiment. The enterprise environment 102, the vendor environment 104, and/or other environments (e.g., third party environments) can utilize the network topology 900 for the data center cloud 902. The illustrated network topology 900 includes three layers: an application ("APP") layer 904, a virtual network topology layer 906, and a physical network topology layer 908. The APP layer 904 can include one or more VNFs 910A-910N (such as the VNFs 822 and the execution instances 108), each of which can be divided to one or more sub-VNFs 912 to be executed by one or more VMs 914.

The virtual network topology layer 906 includes the VMs 914, one or more hypervisors 916, and one or more server modules ("blades") 918. Each blade 918 can support one hypervisor 916 that, in turn, can manage one or more of the VMs 914. The blades 918 provide computing capacity to support the VMs 914 carrying the VNFs 912. The hypervisors 916 provide resource management among the VMs 914 supported thereby. A logical server cluster 920 is created for resource allocation and reallocation purpose, which includes the blades 918 in the same server host 922. Each server host 922 includes one or more of the server clusters 920.

The physical network topology layer 908 includes an Ethernet switch ("ESwitch") group 924 and a router group 926. The ESwitch group 924 provides traffic switching function among the blades 918. The router group 926 provides connectivity for traffic routing between the data center cloud 902 and virtualized IP network(s) 928. The router group 926 may or may not provide multiplexing functions, depending upon network design.

The virtual network topology layer 906 is dynamic by nature, and as such, the VMs 914 can be moved among the blades 918 as needed. The physical network topology 908 is more static, and as such, no dynamic resource allocation is involved in this layer. Through such a network topology configuration, the association among application VNFs 910, the VM 914 supporting the application VNFs 910, and the blades 918 that hosts the VM 914 can be determined.

In the illustrated example, a first VNF is divided into two sub-VNFs, VNF 1-1 912A and VNF 1-2 912C, which is executed by VM 1-1-1 914A and VM 1-N-1 914C, respectively. The VM 1-1-1 914A is hosted by the blade 1-1 918A and managed by the hypervisor 1-1 916A in the server cluster 1 920A of the server host 922. Traffic switching between the blade 1-1 918A and the blade 1-N 918N is performed via ESwitch-1 924A. Traffic communications between the ESwitch group 924 and the virtualized IP network(s) 928 are performed via the router group 926. In this example, the VM 1-1-1 914A can be moved from the blade 1-1 918A to the blade 1-N 918N for VM live migration if the blade 1-1 918A is detected to have difficulty to support the VNF 1-1 912A performance requirements and the blade 1-N 918N has sufficient capacity and is available to support the VNF 1-1 912A performance requirements. The virtual network topology 906 is dynamic by nature due to real-time resource allocation/reallocation capability of cloud SDN. The association of application, VM, and blade host in this example is the VNF 1-1 912A is executed on the VM 1-1-1 914A hosted by the blade 1-1 918A in the server cluster 1 920A.

Based on the foregoing, it should be appreciated that aspects of managing enterprise software licenses for VNFs have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
acquiring, by an enterprise system comprising a processor, a software license for a software asset provided by a vendor to be instantiated and used by a cloud computing environment associated with an enterprise associated with the enterprise system;
receiving, by an enterprise anchor point ("EAP") module, an enterprise security certificate for the software asset from the vendor, wherein the EAP module is executed by the enterprise system associated with the enterprise and managed by the vendor;
instantiating, by the enterprise system, an execution instance of the software asset in the cloud computing environment associated with the enterprise, wherein the software asset comprises a vendor key and a secure uniform resource locator ("URL") embedded by the vendor, and wherein the execution instance of the software asset uses the secure URL to connect to the EAP module in response to instantiation of the execution instance of the software asset in the cloud computing environment associated with the enterprise;
receiving, by the EAP module, the vendor key from the execution instance of the software asset; and
decrypting, by the EAP module using the vendor key provided by the execution instance of the software asset, the enterprise security certificate for the software asset to ensure the software asset is instantiated and used in accordance with the software license.

2. The method of claim 1, wherein acquiring, by the enterprise system, the software license for the software asset to be instantiated and used by the cloud computing environment associated with the enterprise comprises executing, by the processor of the enterprise system, an enterprise entitlement license purchasing and acquisition ("EELPA") module, to negotiate a purchase and acquisition of the software license and wherein the method further comprises:
providing, by the EELPA module, license information associated with the software license to an enterprise license tracking ("ELT") module;
providing, by the EELPA module, license metadata associated with the software license to an enterprise service design ("ESD") module;
determining, by the ESD module, a service model that uses the software asset in accordance with the software license; and
providing, by the ESD module, the service model to the ELT module and to an enterprise software instance controller ("ESIC") module.

3. The method of claim 2, further comprising:
receiving, by the ESIC module, a software instance instantiation trigger, wherein instantiating, by the enterprise system, the execution instance of the software asset in the cloud computing environment is in response to the software instance instantiation trigger;
reporting, by the ESIC module, tracking and auditing data to an enterprise usage, topology, and inventory ("EUTI") module; and
providing, by the ESIC module, through the EELPA, feedback to the vendor based upon the tracking and auditing data.

4. The method of claim 1, further comprising
embedding, by a supplier license management tracking ("SLMT") module of the vendor, the secure URL and the vendor key in the software asset;
generating, by the SLMT module, the enterprise security certificate;
providing, by the SLMT module, the enterprise security certificate to the EAP module; and
matching, by the EAP module, the vendor key received from the execution instance of the software asset to the enterprise security certificate for the software asset.

5. The method of claim 1, wherein the software asset comprises a virtual network function.

6. A system comprising:
a processor; and
a memory comprising instructions for a plurality of modules that, when executed by the processor, cause the processor to perform operations comprising
acquiring a software license for a software asset provided by a vendor to be instantiated and used by a cloud computing environment associated with an enterprise associated with the system,
receiving, by an enterprise anchor point ("EAP") module of the plurality of modules, an enterprise security certificate for the software asset from the vendor, wherein the EAP module is executed by the system and managed by the vendor,
instantiating an execution instance of the software asset in the cloud computing environment associated with the enterprise, wherein the software asset comprises a vendor key and a secure uniform resource locator ("URL") embedded by the vendor, and wherein the execution instance of the software asset uses the secure URL to connect to the EAP module in response to instantiation of the execution instance of the software asset in the cloud computing environment associated with the enterprise,
receiving, by the EAP module, the vendor key from the execution instance of the software asset, and
decrypting, by the EAP module using the vendor key provided by the execution instance of the software asset, the enterprise security certificate to ensure the software asset is instantiated and used in accordance with the software license.

7. The system of claim 6, wherein acquiring the software license for the software asset to be instantiated and used by the cloud computing environment associated with the enterprise comprises executing an enterprise entitlement license purchasing and acquisition ("EELPA") module, to negotiate a purchase and acquisition of the software license, and wherein the operations further comprise:
providing, by the EELPA module, license information associated with the software license to an enterprise license tracking ("ELT") module;
providing, by the EELPA module, license metadata associated with the software license to an enterprise service design ("ESD") module;

determining, by the ESD module, a service model that uses the software asset in accordance with the software license; and providing, by the ESD module, the service model to the ELT module and to an enterprise software instance controller ("ESIC") module.

8. The system of claim 7, wherein the operations further comprise:

receiving, by the ESIC module, a software instance instantiation trigger, wherein instantiating the execution instance of the software asset in the cloud computing environment is in response to the software instance instantiation trigger;

reporting, by the ESIC module, tracking and auditing data to an enterprise usage, topology, and inventory ("EUTI") module; and providing, by the ESIC module, through the EELPA, feedback to the vendor based upon the tracking and auditing data.

9. The system of claim 6, wherein the operations further comprise:

embedding, by a supplier license management tracking ("SLMT") module of the vendor, the secure URL and the vendor key in the software asset;

generating, by the SLMT module, the enterprise security certificate;

providing, by the SLMT module, the enterprise security certificate to the EAP module; and matching, by the EAP module, the vendor key received from the execution instance of the software asset to the enterprise security certificate for the software asset.

10. The system of claim 6, wherein the software asset comprises a virtual network function.

11. A computer-readable storage medium comprising computer-executable instructions for a plurality of modules that, when executed by a processor of an enterprise system, cause the processor to perform operations comprising acquiring a software license for a software asset provided by a vendor to be instantiated and used by a cloud computing environment associated with an enterprise associated with the enterprise system;

receiving, by an enterprise anchor point ("EAP") module of the plurality of modules, an enterprise security certificate for the software asset from the vendor, wherein the EAP module is executed by the enterprise system associated with the enterprise and managed by the vendor;

instantiating an execution instance of the software asset in the cloud computing environment associated with the enterprise, wherein the software asset comprises a vendor key and a secure uniform resource locator ("URL") embedded by the vendor, and wherein the execution instance of the software asset uses the secure URL to connect to the EAP module in response to instantiation of the execution instance of the software asset in the cloud computing environment associated with the enterprise;

receiving, by the EAP module, the vendor key from the execution instance of the software asset; and decrypting, by the EAP module using the vendor key provided by the execution instance of the software asset, the enterprise security certificate to ensure the software asset is instantiated and used in accordance with the software license.

12. The computer-readable storage medium of claim 11, wherein acquiring the software license for the software asset to be instantiated and used by the cloud computing environment associated with the enterprise comprises executing an enterprise entitlement license purchasing and acquisition ("EELPA") module, to negotiate a purchase and acquisition of the software license, and wherein the operations further comprise:

providing, by the EELPA module, license information associated with the software license to an enterprise license tracking ("ELT") module;

providing, by the EELPA module, license metadata associated with the software license to an enterprise service design ("ESD") module;

determining, by the ESD module, a service model that uses the software asset in accordance with the software license; and providing, by the ESD module, the service model to the ELT module and to an enterprise software instance controller ("ESIC") module.

13. The computer-readable storage medium of claim 12, wherein the operations further comprise:

receiving, by the ESIC module, a software instance instantiation trigger, wherein instantiating the execution instance of the software asset in the cloud computing environment is in response to the software instance instantiation trigger;

reporting, by the ESIC module, tracking and auditing data to an enterprise usage, topology, and inventory ("EUTI") module; and providing, by the ESIC module, through the EELPA, feedback to the vendor based upon the tracking and auditing data.

14. The computer-readable storage medium of claim 11, wherein the operations further comprise:

embedding, by a supplier license management tracking ("SLMT") module of the vendor, the secure URL and the vendor key in the software asset;

generating, by the SLMT module, the enterprise security certificate;

providing, by the SLMT module, the enterprise security certificate to the EAP module; and matching, by the EAP module, the vendor key received from the execution instance of the software asset to the enterprise security certificate for the software asset.

* * * * *